No. 727,597. PATENTED MAY 12, 1903.
J. M. DAY.
AUTOMATIC WATERING DEVICE.
APPLICATION FILED MAY 19, 1902.
NO MODEL.

Witnesses
A. B. Day
L. E. Day

Inventor
John M. Day

No. 727,597. Patented May 12, 1903.

UNITED STATES PATENT OFFICE.

JOHN M. DAY, OF LINCOLN, NEBRASKA.

AUTOMATIC WATERING DEVICE.

SPECIFICATION forming part of Letters Patent No. 727,597, dated May 12, 1903.

Application filed May 19, 1902. Serial No. 108,104. (No model.)

*To all whom it may concern:*

Be it known that I, JOHN M. DAY, residing at No. 2540 North Twelfth street, in the city of Lincoln, Lancaster county, Nebraska, have invented certain useful Improvements in Automatic Watering Devices; and I do hereby declare that the following is a full, clear, and exact description of the invention, such as will enable others skilled in the art to which it appertains to make and use the same, reference being had to the accompanying drawings, which form a part of this specification.

This invention relates to improvements in automatic watering devices.

The principal object of this invention is to provide a simple and inexpensive apparatus for watering chickens, ducks, geese, and other barnyard fowls and small live stock by furnishing them at all times with an abundance of fresh pure water for drinking purposes.

The invention consists in the construction, arrangement, and combination of parts, as hereinafter set forth, pointed out in my claims, and illustrated in the accompanying drawings, in which—

Figure 1:
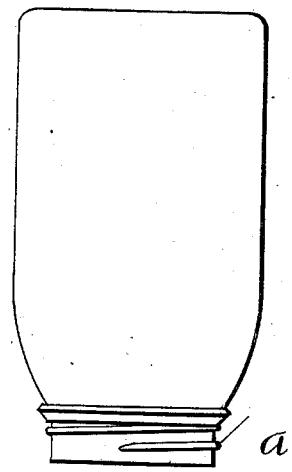
Figure 3:
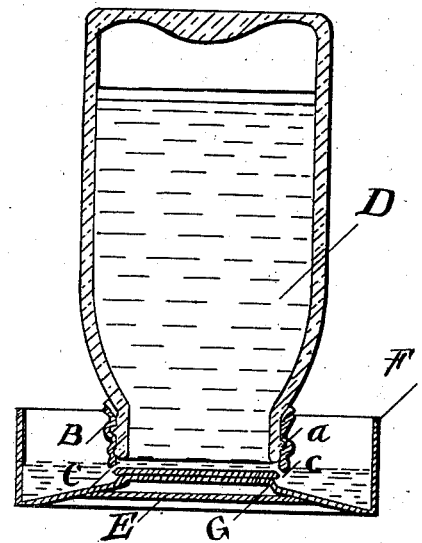
Figure 4:
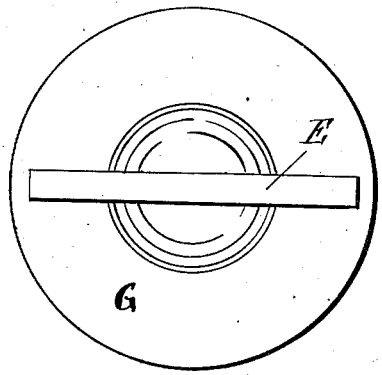
Figure 2:
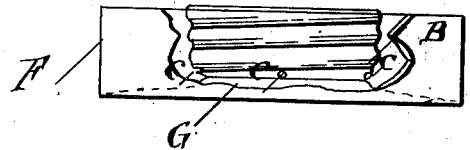

Figure 1 illustrates a glass fruit-jar such as is in general use and commonly known as the "Mason" fruit-jar. Fig. 2 is a small pan with the bottom raised in the center, with a common fruit-jar cap attached to the highest point of the bottom. Fig. 3 is a combination of the two, forming the complete watering device, while Fig. 4 shows a bottom view.

Like letters of reference designate corresponding parts in all figures of the drawings.

*a* is the screw on the jar, such as is on all jars of the Mason pattern.

B is a screw-cap, such as is commonly used in covering fruit-jars, with the top secured to the center of the raised bottom G of the pan, as shown in Figs. 2 and 3, with a suitable number of holes or openings C C at or near the perimeter of the cap. The sides F of the pan are raised above the openings in this cap.

A bar E is soldered across underneath the raised bottom of the pan in such a manner as to serve as a handle in carrying the completed watering device and to assist in removing the cap from the jar.

When it is desired to use this watering device, the jar is set upon a table or other suitable place and filled with water. The pan, with the cap fastened to its center, is then attached to the glass jar by means of the screw in the same manner as in screwing the cap on in ordinary use by grasping the bar E, which serves as a handle in tightening the screw. The whole apparatus is then inverted quickly, so that no water will be spilled. The water D will now run out of the jar, as is shown in Fig. 3, until it rises in the pan sufficiently high to prevent the ingress of air into the jar through the holes C C. When the chickens or other live stock drink the water out of the pan until it is lower than the holes, the air rushes in through C C and permits the water to flow out into the pan until it rises high enough to close the openings again. One or more of these openings may be made, as desired.

The cap of the jar may be and is preferably constructed of zinc and the pan of tin, galvanized iron, or other suitable material, the zinc preventing the other metal from rusting.

The construction of the apparatus may be varied thus: The pan may be constructed with a flat bottom and the screw-cap raised the proper distance from the bottom by means of legs or supports attached to the bottom or from the sides of the pan. A damper may be used to close the opening through the cap while the device is being inverted after it is filled, the damper to be opened when it is desired for the water to flow out into the pan.

As is well known, all of the pint, quart, half-gallon, and gallon fruit-jars in common use have the same-sized top and are covered by the same-sized cap with the same thread, and for this reason this device is peculiarly adapted to the convenience of those desiring watering-fountains with varying capacity. These jars are usually composed of glass, and therefore disclose readily the amount of water contained therein.

Having thus fully described my invention and the construction of the same, what I claim as new, and desire to secure by Letters Patent, is—

1. In an automatic watering device, the combination of a jar or bottle, with the top so constructed that a cap may be screwed upon it, a pan with the bottom raised toward the center, an inverted screw-cap for said jar secured to said pan near the center of its raised bottom, with an opening through said inverted screw-cap near the perimeter of the lower part of the same, said opening being lower than the sides of said pan, so that said pan may be attached to the said jar or bottle by means of said screw substantially as described.

2. In an automatic watering device, the combination of a jar or bottle, with a top so constructed that a cap may be screwed upon it, a pan with the bottom raised toward the center, an inverted screw-cap for said jar secured to said pan near the center of its raised bottom, with an opening through said inverted screw-cap near the perimeter of the lower part of the same, said opening being lower than the sides of said pan; so that said pan may be attached to said jar or bottle by means of said screw and a bar across underneath the raised bottom of said pan to serve as a handle, substantially as described.

3. In a watering device the combination of a pan with a screw-cap inversely attached to the inside of said pan, with an opening in said cap to admit of the passage of air and water, the sides of said pan rising higher than said opening, and a jar or bottle attached to said cap.

4. In a watering device, the combination of a fruit-jar or bottle with the top so constructed that a cap may be secured thereto, and a pan having secured within itself a cap so constructed as to be attached to the top of said jar or bottle, with an opening in said cap at a point above the bottom of said pan but below the sides of the same, substantially as described.

JOHN M. DAY.

Witnesses:
 A. B. DAY,
 L. E. DAY.